G. L. SWABB.
LOCOMOTIVE.
APPLICATION FILED JUNE 30, 1916.
1,220,570.
Patented Mar. 27, 1917.
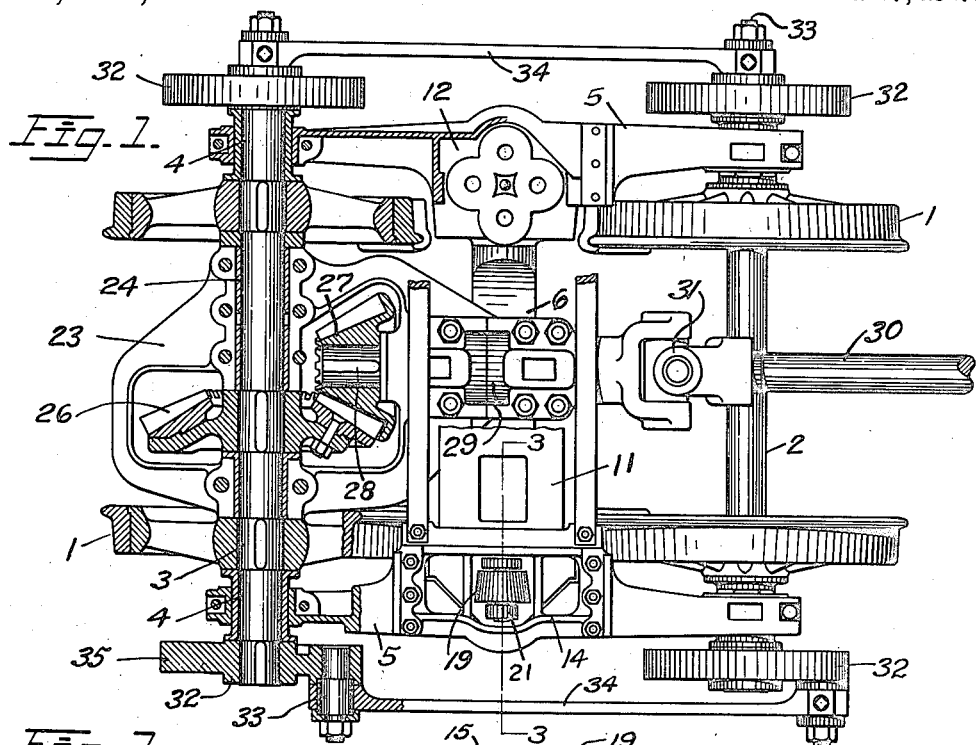
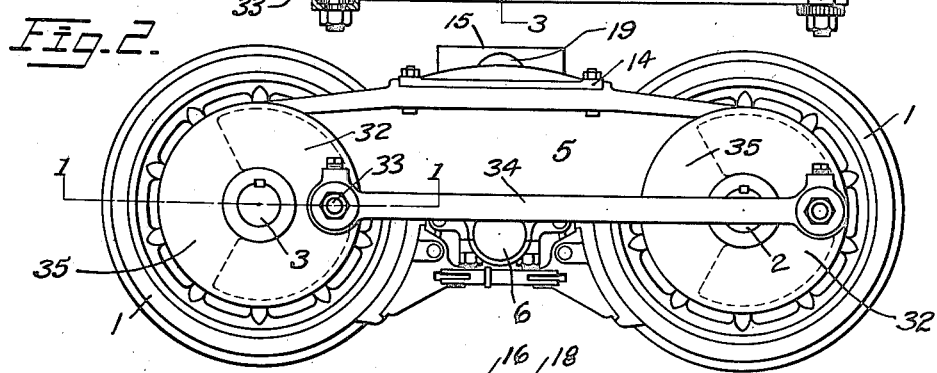
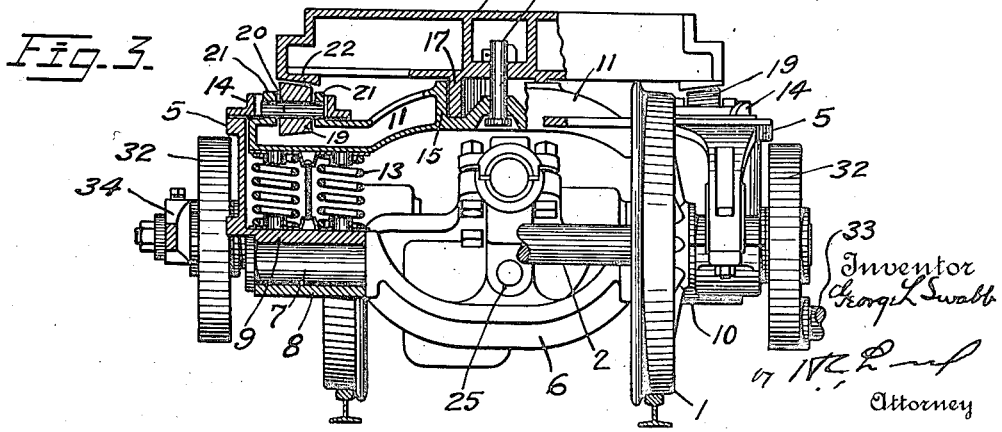
Inventor
George L. Swabb
by
Attorney

UNITED STATES PATENT OFFICE.

GEORGE L. SWABB, OF ERIE, PENNSYLVANIA, ASSIGNOR TO HEISLER LOCOMOTIVE WORKS, OF ERIE, PENNSYLVANIA, A CORPORATION OF PENNSYLVANIA.

LOCOMOTIVE.

1,220,570.

Specification of Letters Patent.

Patented Mar. 27, 1917.

Application filed June 30, 1916. Serial No. 106,836.

*To all whom it may concern:*

Be it known that I, GEORGE L. SWABB, a citizen of the United States, residing at Erie, county of Erie, and State of Pennsylvania, have invented new and useful Improvements in Locomotives, of which the following is a specification.

This invention relates to locomotives and consists in certain improvements in the construction thereof as will be hereinafter fully described and pointed out in the claims.

More particularly the invention relates to what are ordinarily termed geared locomotives and to the construction of the trucks for such locomotives.

Geared locomotives have heretofore been made in which the driving gears are arranged between the side frames of the trucks. In such construction it has been common to arrange the side frames of the trucks inside of the wheels. It is desirable to maintain the center of gravity at a point as low as possible and this becomes of greater importance with the narrower gages. It is also desirable even with these narrower gages to build a locomotive of sufficient heft and power to carry heavy loads. The present invention has for its object the improvement of such trucks, especially for the narrower gages.

The invention is illustrated in the accompanying drawings:—

Figure 1 shows a plan view of the truck, part being in section on the line 1—1 in Fig. 2.

Fig. 2 a side elevation of the truck.

Fig. 3 an end elevation of the truck, a part being in section on the line 3—3 in Fig. 1.

1—1—1—1 mark the wheels, 2 one of the axles, 3 the other of the axles, 4 the bearings and 5 the side frames. It will be noted that the side bearings are outside the wheels and the side frames on which the bearings 4 are arranged are also outside the wheels.

A swivel bar 6 extends between the side frames. It is provided with the bearing ends 7 which are arranged to operate in the bearings 8 on the frame, the bearings 8 being made up of a top portion 9 which is formed in the frame and the caps 10 which are secured beneath the axles. The truck spring bar 11 has its ends loosely mounted in pockets 12 in the side frames. The ends rest on springs 13 nested in the pockets 12. Caps 14 are arranged over the pockets holding the spring bar in place. The spring bar however, has sufficient freedom to permit the free swinging of the side frames on the swivels arranged on the swivel bar 6. The truck spring bar is provided with a center bearing 15 and the locomotive bolster 16 has a bearing 17 operating in connection with the bearing 15. A king bolt 18 locks the bolster and spring bar 11 together. Side rolls 19 are carried by pins 20, the pins being mounted in flanges 21 on the ends of the spring bar 11. Side bearings 22 are arranged on the locomotive bolster and these operate in connection with the rollers 19 in the usual manner. A gear frame which also forms a housing 23 has a bearing 24 on the axle 3 and also a swivel bearing 25 on the swivel bar 6, the bearing 25 having a longitudinal axis. In this way the swivel bearing can move out of alinement with the axle and the gear frame remains in alinement with the axle. A beveled gear 26 is fixed on the axle 3 and meshes a gear 27 fixed on the drive shaft 28. The drive shaft is extended by the shaft 30 which is connected with the shaft 28 by means of a knuckle joint 31. The shaft 28 extends through a bearing 29 on the gear frame.

Disks 32 are arranged on the ends of the axles and these are provided with crank pins 33 and the crank pins at each side are connected by rods 34. The disks 32 are provided with the weighted portions 35 which balance the crank and connecting rods. Heretofore it has been common to balance the crank and connecting rods by counterweighting the drive wheels. By providing a disk and arranging the counter-weight in the disk itself the axle is relieved of very severe strains which the off-set of the counter-weight would aggravate.

The swiveled frame here shown follows along the lines of the swiveled frame disclosed in the patent issued to W. M. Fawcett and myself #994,252. In this structure, however, the wheels are mounted outside the side frames. It will be noted that the swivel frame with its single connection between the side frames peculiarly adapts itself for placing the wheels within the side frames in that this single connection may extend between the two sets of wheels.

In this construction the center of gravity is maintained as low as with the wider gages. There is ample room for the gear frames and gears of adequate size for comparatively heavy locomotives even with very narrow gages. The side bearings of the truck are carried well out to the sides of the frame so that the side strains are easily maintained. This is accomplished without interfering in any way with the full flexibility of the truck.

What I claim as new is:—

1. In a locomotive truck, the combination of driving wheels; axles on which said wheels are fixed; side frames outside the wheels; bearings for the axles mounted on the side frames; a gear drive operating upon one of the axles between the wheels; a spring bar; and side spring bar bearings outside the wheels.

2. In a locomotive truck, the combination of two sets of wheels, one set of which has driving wheels; axles on which said wheels are mounted; side frames outside the wheels; bearings for the axles mounted on the side frames; and a swivel bar connection between the side frames having swivel connections with the side frames, said bar being arranged between the sets of wheels.

3. In a locomotive truck, the combination of two sets of wheels, one set of which has driving wheels; axles on which said wheels are mounted; side frames outside the wheels; bearings for the axles mounted on the side frames; a swivel bar connection between the side frames having swivel connections with the side frames, said bar being arranged between the sets of wheels; a spring bar resting on the side frames; and side spring bar bearings extending outside the wheels.

4. In a locomotive truck, the combination of two sets of wheels, one set of which has driving wheels; axles on which said wheels are mounted; side frames outside the wheels; bearings for the axles mounted on the side frames; a swivel bar connection between the side frames having swivel connections with the side frames, said bar being arranged between the sets of wheels; and a gear drive for one of the axles arranged between the wheels.

5. In a locomotive truck, the combination of two sets of wheels, one set of which has driving wheels; axles on which said wheels are mounted; side frames outside the wheels; bearings for the axles mounted on the side frames; a swivel bar connection between the side frames having swivel connections with the side frames, said bar being arranged between the sets of wheels; a bearing frame mounted on the driving axle and having a swivel connection with the swivel bar with a longitudinal axis; a gear on the axle; a drive shaft mounted on the gear frame; and a gear on the drive shaft driving the axle gear.

6. In a locomotive truck, the combination of driving wheels; axles on which said wheels are fixed; side frames outside the wheels; bearings for the axles mounted on the side frames; a gear drive operating on one of the axles between the wheels; cranks on the outer ends of the axles; means at the outer ends of the axles for balancing the cranks; and connecting rods between the cranks at each side of the frame.

In testimony whereof I have hereunto set my hand.

GEORGE L. SWABB.